Dec. 22, 1942.    F. P. WILLIAMS ET AL    2,305,945
METHOD AND APPARATUS FOR MANUFACTURE OF SYNTHETIC RESINOUS PRISMS
Filed Aug. 31, 1940
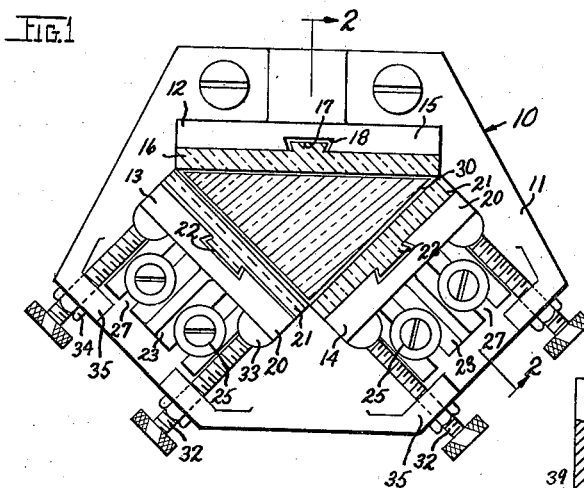
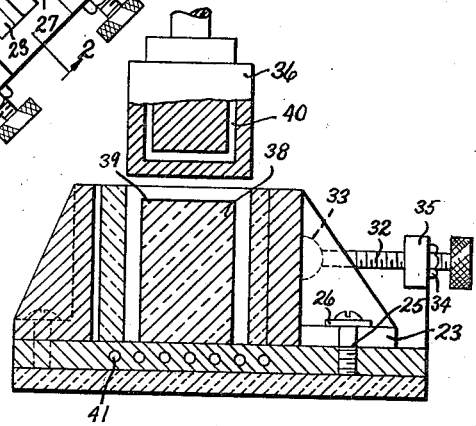
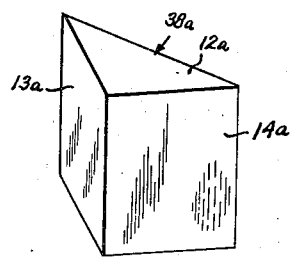
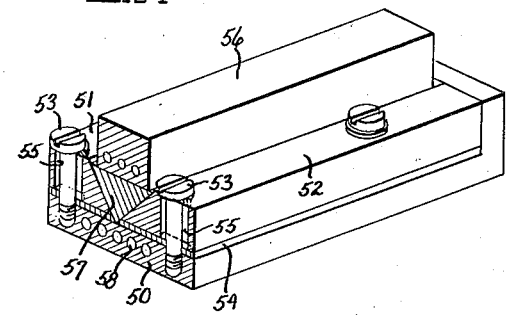
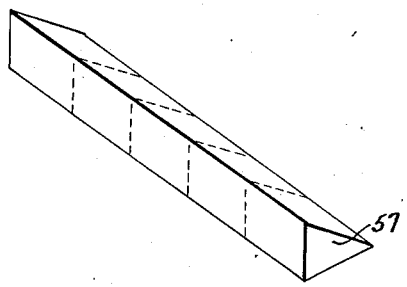
INVENTOR
FRANK P. WILLIAMS
BY  CHARLES V. SMITH
ATTORNEY Patented Dec. 22, 1942

2,305,945

UNITED STATES PATENT OFFICE 2,305,945

METHOD AND APPARATUS FOR MANUFACTURE OF SYNTHETIC RESINOUS PRISMS

Frank P. Williams and Charles V. Smith, Dayton, Ohio, assignors to The Univis Lens Company, Dayton, Ohio, a corporation of Ohio Application August 31, 1940, Serial No. 355,016

5 Claims. (Cl. 18—34)

This invention relates to a method and an apparatus for producing prisms from resinous materials, and more particularly to the production of prisms for optical use.

Prisms heretofore used in optical work have been constructed from glass. These prisms are relatively expensive to manufacture since each of the surfaces of the prism must be ground and polished by separate operations. Further, the fragility of glass is detrimental to certain prisms which are used in articles having severe use.

It is thus a purpose of my invention to produce a prism from unbreakable materials, such as synthetic resin. There are a number of resins available on the market which have optical properties comparable with optical glass. Some of these resins are known to the trade by the names Crystalite, Lucite, Plexiglas, and others. The synthetic resins which have the most favorable characteristics for optical use are particularly those organic resins produced by the polymerization of the monomeric derivatives of acrylic and methacrylic acids. These resins have shown that their indices of refraction are substantially the same as optical glass and are of extreme clearness and will pass substantially the same quantity of light as optical glass.

There have been other optical articles, such as lenses and optical planos, which have been produced from the synthetic resins. It is an object of my invention, however, to provide a method and an apparatus for producing unbreakable prisms from synthetic resins.

It is another object of my invention to provide a method for producing a prism which will produce a surface finish upon the prism of high optical perfection.

It is another object of the invention to produce all of the surface finishes upon a prism simultaneously.

It is another object of the invention to simultaneously produce the surface finishes of high optical perfection upon the prism surfaces while forming or shaping the prism.

It is another object of the invention to provide a method for producing a prism wherein the physical alteration of a blank of synthetic resin is caused by applying pressure upon certain surface areas to cause expansion of other areas into engagement with prism surfaces of a mold having high optical surface finish.

It is another object of the invention to produce a prism from a blank of synthetic resin by applying pressure to the end surfaces of the prism, which need not have an optical finish, to cause expansion of the prism faces of the resinous blank into engagement with a prism shaped mold having a high optical surface finish.

It is another object of the invention to form a prism from a synthetic resin by elevating the temperature of the resin within a mold, the temperature elevation being occasioned by heat transfer from heated surfaces engaging the surfaces of a prism which need not be imparted with a high optical finish.

A still further object of the invention is to provide such a method for forming a prism wherein the heat transfer surfaces are used for applying pressure upon the heated resinous blank for expanding the walls thereof against surfaces having a high optical finish.

Another object of the invention is to provide a method for producing a prism from a synthetic resin within a mold in which the angular relation of the prism walls can be controlled.

It is another object of the invention to provide an apparatus for producing a prism for synthetic resinous materials having a plurality of highly finished parallelogram shaped surfaces which can be arranged to form a mold cavity for a prism.

Another object of the invention is to provide an apparatus for forming a prism from synthetic resin wherein the plurality of walls of the mold for forming the prism are adjustable to control the angular relation therebetween.

A still further object of the invention is to provide an apparatus for forming a prism of synthetic resin wherein the walls of the mold are not heated, and the resinous blank, adapted to be positioned within the mold, is heated by means of heated surfaces engaging the surfaces of the prism which need not be provided with an optical finish.

Another object of the invention is to provide a method for producing an optical article by positioning the same within a mold and elevating the temperature of the blank of resinous material to form the optical article by transferring heat thereto from surfaces having a high heat transfer rate, and molding the article to the shape of the mold which has surfaces of relatively lower heat transfer value, but capable of imparting a high surface finish upon the blank of resinous material.

A still further object of the invention is to provide a method and an apparatus for transferring heat to an optical article from metal surfaces while forming the article into a desired shape confined within mold walls of glass to impart a high surface finish to the mold surfaces.

Another object of the invention is to form a prism from a blank of synthetic resinous material which is substantially of the same shape as the prism to be formed therefrom.

A still further object of the invention is to form such a prism from a pre-shaped blank of resinous material by causing the blank to be slightly expanded into engagement with surfaces having a high optical finish.

Further objects and advantages will become apparent from the description and the drawing.

In the drawing:

Figure 1 is a top plan view of a mold, partially in cross-section, for forming prisms according to the teachings of this invention;

Figure 2 is a vertical cross-sectional view taken along line 2—2 of Figure 1;

Figure 3 is a perspective elevational view of a prism formed in the mold of Figures 1 and 2;

Figure 4 is a perspective elevational view, partially in cross-section, showing another form of mold for producing a prism, and particularly a prism of substantial length;

Figure 5 is a perspective elevational view of a prism formed in the mold of Figure 4, which prism bar can be re-cut into shorter individual prisms.

To produce prisms which are of sufficient perfection for optical work, it is required that the index of refraction of the prism shall remain constant and that the surfaces of the planes of the prism shall be highly polished and free of any imperfections. When using synthetic resinous materials to produce prisms several factors enter into their manufacture. The usual procedure, when forming optical articles from solid synthetic resinous materials, is to raise the temperature of a blank of the solid synthetic material to within a range at which the physical shape of the blank can be altered. However, to alter the shape of the blank it is required that the general mass of the blank shall move during the deformation. This physical alteration, or deformation, of the blank of resinous material has heretofore produced deleterious optical effects within the resinous material, particularly noted by bi-refringence.

To produce an optical article, of which prisms are a class, it is required that the movement of the resinous material be controlled at a definite rate of movement according to the temperature at which the blank of material will be worked. We have determined that all plastic materials, particularly those having favorable optical characteristics, have an undesirable characteristic of developing internal strain when the material is deformed. This internal strain is not of sufficient value as to destroy the physical characteristics of the resinous material, but is of sufficient value that the optical properties of the material are impaired. The particular property, more noticeable than others, which is impaired is the index of refraction. The strain caused by deformation, and known as "optical strain," is of sufficient value to displace the optical paths through the material, resulting in bi-refringence.

We have determined that there is a rate of deformation for plastic material beyond which rate optical strain is produced if the material is deformed at any rate greater than the specified rate. This rate of deformation cannot be definitely specified since it varies for various materials. However, such a rate does exist and, in general, the rate of deformation increases with an increase in temperature of the resinous material.

As long as the rate of deformation for the solid blank of resinous material is retained below that rate which will not produce deleterious optical strain, the physical characteristics of the material will not be altered. The physical characteristics which are altered by rapid rates of deformation are particularly noticeable in a loss of hardness of material, loss of resistance to chemical action, increased fragility, and a tendency toward crazing.

We have also found that the surface finish of the prism, or optical article, is improved according to the type of material used to produce the optical surface upon the prism. At the present time glass is the best material which has been found to impart a high optical finish upon the surface of a resinous material. However, many of the resinous materials, which are favorable in their optical properties, have a considerable affinity for glass. If large surface movements are required between the resinous material and the glass, defects in the surface appear upon the optical surface of the article formed from the resinous material.

In this invention, therefore, we provide a method and an apparatus for producing prisms of optical perfection from blanks of synthetic materials. To practice our invention we provide a mold or die 10. The die 10 is provided with a base 11 upon which a plurality of vertically positioned walls 12, 13 and 14 are positioned. These vertical walls provide the side walls forming the planes of a prisms and are adapted to be arranged in a manner that a mold cavity is formed by the positioning of the plurality of walls. For the purposes of describing the invention, there is shown a prism of triangular shape. The teachings of the invention, however, are not limited to the manufacture of triangular shaped prisms but may produce a prism of any polygon shape, the only requirement being that the walls forming the parallelograms for the polygon shaped prism shall be arranged to provide a mold cavity in which a blank of synthetic resinous material can be inserted.

In this invention the wall 12 consists of a vertically positioned metal support member 15 which is stationarily secured to the base 11 in any suitable manner. The face of the wall 12 is surfaced with a glass surfacing member 16. The glass member 16 is provided with the male portion 17 of a dovetail which is adapted to extend into the female portion 18 of the dovtail provided in the vertical support 15. The cooperation of the dovetail portions 17 and 18 retain the glass face 16 in position adjacent the support member 15.

The wall members 13 and 14, forming the two opposite sides of the triangle for a prism, are of identical structure. These wall members, 13 and 14, are provided with a vertically positioned metal support member 20 which is provided with a glass face 21. The glass face 21 is retained upon the support 20 by means of the dovetail joint 22. The support member 20 is provided with a base portion 23 which extends from the support 20 at a right angle thereto. This base 23 is adapted to rest upon the base 11 and be secured thereto by means of the machine-screws 25.

The machine-screws 25 are provided with enlarged heads 26. The machine-screws 25 extend through the base 23 within slots 27 provided therein, the enlarged heads 26 resting upon the top surface of the base 23 to bind the same to the base 11 when the screws 25 are tightened.

As many be seen from the drawings of Figure 1, the walls 12, 13 and 14 provide a triangular shaped cavity 30 conforming to three sides of a triangular shaped prism, the outer edges of the walls 12, 13 and 14 are brought into close proximity to form, as nearly as possible, a closed cavity. This cavity 30 provides the mold in which the prism will be formed.

Since the angular relation of the faces of the prism is of utmost importance, it is required that some form of adjustment be provided to accurately control this angular relation. In this invention there is provided a pair of threaded screw members 32 for each of the walls 13 and 14. These screw members 32 are secured to the outer edges of the support member 20 by means of pawl or socket joints 33. To adjust the angular relation of the wall 13 with respect either the wall 12 or 14, the screws 25 are loosened. The lock nuts 34, provided on the threaded members 32, are also loosened so that the threaded members 32 can be revolved within their support members 35, thereby causing the threaded members 32 to move inwardly or outwardly, according to their direction of rotation, and carry the wall 13 therewith. If the screws 32 are both turned in the same direction the wall 13 will be moved outwardly or inwardly in a parallel plane, while, if the screws 32 are rotated in opposite directions, the angular position of the plane of the wall 13 will be changed with respect to the wall 12 and the wall 14. Similar angular correction is provided for the wall 14. This die 10 having the walls 12, 13 and 14 for providing a mold cavity 30 is adapted to have a plunger 35 in cooperative working relation therewith. The plunger 35 is connected to the operating mechanism of a suitable press and is adapted to be forced into the mold cavity 30 in sliding engagement with the walls thereof to compress a blank of resinous material which is placed within the mold cavity.

When forming a prism, or optical article, a blank of resinous material 38 is placed within the mold cavity 30. The blank 38 is preferably preformed to substantially the shape of the mold cavity 30. This pre-forming of the blank 38 may take place either at the time of manufacture of the synthetic resin, or may be subsequently formed either by pressing a blank of material into a triangular shape or by cutting the material to the shape desired. If the material is pre-formed during the casting operation when producing the resinous material, the blank 38 will be free of any strain. This is also true if the blank 38 is cut or machined from a larger blank. However, if the blank 38 has been altered in physical shape by pressing the same within a mold, such physical change in shape must be accomplished at a rate of deformation which will not produce optical strain within the blank 38.

Upon the blank 38 being positioned within the mold cavity 30, the temperature of the blank is raised to within a range of temperatures at which the material may be altered in physical contour. The temperature elevation of the blank 38 will depend somewhat upon the length of the prism which is to be formed. If the prism is relatively short the blank 38 can be heated by causing the end surfaces 39 thereof to contact heating surfaces. In the arrangement disclosed in Figures 1 and 2, the plunger 35 is provided with heating passages 40 while the base 11 is provided with heating passages 41. When the plunger 35 is brought into engagement with the end surface 39 of the blank 38 heat will be transferred into the blank 38 from the plunger 35 and from the base 11. The heat transfer surfaces of the plunger 35 and the base 11 are preferably of metal, since this material will give the greatest heat transfer rate into the blank 38. These heat transfer surfaces of the plunger 35 and the base 11 can be of metal since it is not necessary that the end surfaces 39 of the prism blank 38 be of high optical perfection. The surfaces which are to be of high optical perfection upon the prism blank 38 are those surfaces adjacent the walls 12, 13 and 14, which surfaces have been prepared with a high degree of optical perfection.

Upon the temperature of the blank 38 reaching a predetermined temperature, the plunger 35 can be forced downwardly against the end surfaces 39 of the prism blank 38 whereby the surfaces adjacent the walls 12, 13 and 14 of the die 10 will be forced outwardly into engagement therewith. Upon engaging the optically perfect surfaces of the walls 12, 13 and 14, the perfection of the surfaces will be imparted upon the prism blank 38 whereby the finished prism 38a is produced, the surfaces 12a, 13a and 14a being optically perfect surfaces.

It will be understood that the change in the physical contour of the blank 38 has been carried out at a rate of deformation which does not produce deleterious optical strain within the blank. Further, it can be seen that since the blank 38 is preferably pre-formed, the degree of surface movement between the walls of the pre-formed blank and the walls 12, 13 and 14 is very slight. The compression of the blank 38 by the plunger 35 causes the outward expansion of the blank 38 to increase the cross-sectional area thereof to match the cross-sectional area of the mold cavity 30. Since the degree of movement of the mass of the blank 38 is slight the degree of surface movement will be slight so that the deleterious effects of adhesion between the blank 38 and the glass surfaced walls 12, 13 and 14 will be overcome.

By this method of forming a prism, or optical article, the heat transfer rate into the blank of resinous material can be relatively high since the heat transfer surfaces are made of metal, the heat transfer surfaces contacting surfaces upon the optical article which do not require an optical finish, while the optically finished surfaces of the optical article are brought into contact with glass surfaces which have a relatively low heat transfer rate. The arrangement provides for a high rate of heat transfer into the blank without necessarily depending upon the heating of the blank through the surfaces of optical finish, which are of relatively low heat transfer value.

It can readily be understood, however, that if a prism is to be formed of substantial length that the walls 12, 13 and 14 can also be heated to increase the rapidity of heat transfer into the resinous blank 38.

In Figure 4, we have shown another form of a mold for producing prisms from blanks of synthetic resinous material. In this arrangement we provide a base 50 upon which the mold segments 51 and 52 are adapted to be secured by means of the bolts 53. The mold segments 51 and 52 provide two of the side walls for a triangular prism. The walls 51 and 52 may be adjusted to alter their angular relation by means of the shims 54. The shims 54 are of slightly wedge shape, a plurality of the shims, each of which has a slightly different wedge shape, being retained on hand for insertion between the mold elements 51 and 52 and the base 50 for changing the angular relation of the mold elements. The bolts 53 extend through slots 55 provided in the mold elements 51 and 52 to permit slight lateral displacement.

A movable mold wall 56 provides the third side of the triangular shaped cavity for the mold for forming a triangular shaped prism. This plunger is connected to a suitable source of power for forcing the same downwardly into the cavity for compressing a blank of resinous material 57 positioned therein. The plunger 56, as well as the base 50, may have suitable heating passages 58 positioned therein for elevating the temperature of the mold and the resinous blank 57.

In this mold arrangement for producing prisms, the surfaces of the mold elements 51 and 52, as well as the surface of the plunger 56, are of optical perfection and may preferably be of glass. While the mold disclosed in Figure 4 can be used for forming short prisms, yet it is particularly applicable when molding prisms of substantial length, such as disclosed in Figure 5. The long prism 57 can be cut by any suitable means into prisms of shorter lengths at any time they are needed, it not being of necessity that the end surfaces of the prisms be of optical finish.

While the form and embodiment disclosed in the drawing and description is a preferred form, yet there are other mechanical arrangements for producing the teachings of this invention, which we do not exclude from the scope of our invention.

Having thus fully described our invention, what we claim as new and desire to secure by Letters Patent, is:

1. A method for producing an optical prism from a blank of resinous material which consists, of positioning a prism shaped blank of resinous material of substantially the shape of the finished prism to be formed therefrom within a mold cavity having a plurality of parallelogram shaped sides having glass surfaces of high optical perfection said cavity being only slightly larger than said blank, heating the blank by contacting only the ends thereof with a heated medium and applying pressure upon the ends of the prism shaped blank to cause the same to expand slightly and uniformly in cross-section to assume the configuration of the mold and to cause the optical surfaces of the prism to engage the optical surfaces of the mold to impart an optical finish on the optical surfaces of the blank.

2. An apparatus for forming an optical prism from a blank of resinous material comprising, a base, a plurality of parallelogram shaped walls movably supported upon said base, said walls carrying wall surfaces of high optical perfection, means for securing said walls to said base in proper angular relation to form a mold cavity, means to adjust the angular relation of the walls with respect to each other, and means for compressing certain areas of a blank of resinous material adapted to be positioned within the mold cavity to cause expansion of other areas into engagement with the optically finished wall surfaces of the mold cavity.

3. An apparatus for forming an optical prism from a blank of resinous material comprising, a plurality of parallelogram shaped walls, said walls carrying wall surfaces of high optical perfection, means for angularly adjusting said walls in proper angular relation to form a mold cavity, closure means for said mold cavity having a high heat transfer rate, plunger means in cooperating working relation with the mold cavity and having a high heat transfer rate, and means for heating only said plunger means and said closure means, said plunger means and said closure means being arranged to cause compression upon the end areas of a blank of resinous material adapted to be positioned in said mold cavity to transfer heat to the blank to soften the same only through the end areas to cause the side wall areas to expand into engagement with the optically finished wall areas of the mold cavity.

4. An apparatus for forming an optical prism from a blank of resinous material comprising, a base, a plurality of parallelogram shaped walls movably supported upon said base, said walls carrying wall surfaces of high optical perfection, means for securing said walls in proper angular relation to form a mold cavity, means to adjust the angular relation of the walls, closure means for said mold cavity having a high heat transfer rate, plunger means in cooperating working relation with the mold cavity having a high heat transfer rate, and means for heating only said plunger means and said closure means, said plunger means and said closure means being arranged to cause compression upon the end walls of a blank of resinous material adapted to be positioned in said mold cavity to transfer heat to the blank through the end walls only to cause the side walls to expand into engagement with the optically finished wall areas of the mold cavity.

5. An apparatus for forming an optical prism from a blank of resinous material comprising, a plurality of parallelogram shaped walls, said walls having glass surfaces of high optical perfection, means for securing said walls upon a closure means in proper angular relation to form a prism-shaped mold cavity, plunger means in cooperating working relation with the mold cavity, and means for heating said plunger means and said closure means, said plunger and closure means each having a high heat transfer rate for transferring heat to the end areas only of a blank of resinous material adapted to be positioned within the mold cavity to soften the same and cause expansion of the side wall areas into engagement with the optically finished glass surfaces of the mold cavity.

FRANK P. WILLIAMS.
CHARLES V. SMITH.